US012465070B2

(12) United States Patent
Koehler-Guenther

(10) Patent No.: US 12,465,070 B2
(45) Date of Patent: Nov. 11, 2025

(54) METHOD FOR PRODUCING CAVIAR OR A CAVIAR-LIKE PRODUCT FROM LIVE MATURE EGGS OF FISH OR CRUSTACEANS

(71) Applicant: Alfred-Wegener-Institut Helmholtz-Zentrum fuer Polar— und Meeresforschung, Bremerhaven (DE)

(72) Inventor: Angela Koehler-Guenther, Taarstedt (DE)

(73) Assignee: ALFRED-WEGENER-INSTITUT HELMHOLTZ-ZENTRUM FUER POLAR— UND MEERESFORSCHUNG, Bremerhaven (DE)

( * ) Notice: Subject to any disclaimer, the term of this patent is extended or adjusted under 35 U.S.C. 154(b) by 460 days.

(21) Appl. No.: 16/714,886

(22) Filed: Dec. 16, 2019

(65) Prior Publication Data
US 2020/0187532 A1 Jun. 18, 2020

Related U.S. Application Data

(60) Provisional application No. 62/780,356, filed on Dec. 17, 2018.

(51) Int. Cl.
*A23L 17/30* (2016.01)
(52) U.S. Cl.
CPC ........... *A23L 17/30* (2016.08); *A23V 2002/00* (2013.01)
(58) Field of Classification Search
CPC . A23L 17/30; A23L 17/35; A23L 7/30; Y02A 40/81
See application file for complete search history.

(56) References Cited

U.S. PATENT DOCUMENTS 3,852,489 A 12/1974 Yip
4,375,481 A * 3/1983 Kuwabara ............... A23L 17/35
426/573

(Continued)

FOREIGN PATENT DOCUMENTS

DE 2416685 A1 10/1974
DE 102004030285 A1 1/2006

(Continued)

OTHER PUBLICATIONS

"Caviar Nutrition Facts." May 20, 2016. <https://caviar.bc.ca/caviar-nutrition-facts/>. Accessed Mar. 10, 2022. (Year: 2016).*

(Continued)

*Primary Examiner* — Ericson M Lachica
(74) *Attorney, Agent, or Firm* — LEYDIG, VOIT & MAYER, LTD.

(57) ABSTRACT

A method for producing caviar or a caviar-like product from live, mature eggs of fish or crustaceans, wherein the eggs are in a fertile but unfertilized state and have a natural potassium content in the egg plasma, includes: treating the eggs in a saline solution which does not damage the eggs and subsequently treating the live, mature eggs in a solution of water and potassium in a concentration which does not damage the eggs and does not change the eggs' potassium content. The water is deionized prior to the addition of a potassium donor for forming a cationic component in the solution, the solution has a temperature that does not damage the eggs, and the eggs are treated in the solution for a duration of a potassium exposure time until an egg envelope of the eggs obtains a desired elastic stabilization.

20 Claims, 9 Drawing Sheets

(56) References Cited

U.S. PATENT DOCUMENTS

| | | | | |
|---|---|---|---|---|
| 4,794,007 | A * | 12/1988 | Ozaki | A23L 17/70 426/643 |
| 5,453,289 | A * | 9/1995 | Wakamaeda | A23L 17/30 426/643 |
| 5,464,648 | A * | 11/1995 | Nishijima | A23L 17/30 426/643 |
| 5,965,191 | A * | 10/1999 | Katayama | A23L 17/50 426/654 |
| 8,039,032 | B2 * | 10/2011 | Koehler-Guenther | A23L 17/30 426/643 |
| 2004/0091593 | A1 * | 5/2004 | Hiraoka | A23L 17/30 426/330.1 |
| 2006/0141123 | A1 * | 6/2006 | Berge | A23L 13/428 426/641 |
| 2007/0243634 | A1 * | 10/2007 | Pamula | G01N 27/447 436/518 |
| 2009/0246335 | A1 | 10/2009 | Koehler-Guenther | |
| 2010/0034922 | A1 * | 2/2010 | Suzuki | A23L 17/30 426/643 |
| 2011/0189365 | A1 * | 8/2011 | Tagrin | A23C 1/06 426/531 |
| 2014/0271990 | A1 * | 9/2014 | Richards | A23L 13/48 426/56 |
| 2018/0280333 | A1 * | 10/2018 | Beaudoin | A61K 8/987 |
| 2018/0295817 | A1 * | 10/2018 | Wong | A01K 67/0275 |
| 2019/0200657 | A1 * | 7/2019 | Hashidate | G01N 21/85 |

FOREIGN PATENT DOCUMENTS

| | | |
|---|---|---|
| EP | 2522226 A2 | 11/2012 |
| EP | 2868207 A1 | 5/2015 |
| JP | 63036763 A | 2/1988 |
| JP | 2001299285 A | 10/2001 |
| RU | 2048111 C1 | 11/1995 |
| RU | 2232523 C2 | 7/2004 |
| SU | 1662469 A1 | 7/1991 |
| WO | 2007045233 A1 | 4/2007 |

OTHER PUBLICATIONS

"How Caviar is Kept Fresh." Jul. 12, 2016. <https://caviarlover.com/blog/fresh-caviar-information/#:~: text=There%20are%20a%20number%20of,F%20to%2038%C2%B0F.>. Accessed Mar. 10, 2022. (Year: 2016).*

Towers, Lucy. "Determining Ovarian Maturity in Farmed Sturgeon for Caviar Production Using Fourier Transform Infrared Spectroscopy." Apr. 28, 2014. <https://thefishsite.com/articles/determining-ovarian-maturity-in-farmed-sturgeon-for-caviar-production-using-fourier-transform-infrared-spectroscopy>.*

Bledsoe, et al. "Caviars and Fish Roe Products," *Critical Reviews in Food Science and Nutrition* 43, 3: 317-356 (May 1, 2003). XP055273360.

Dufresne, et al. "Kinetics of Actin Assembly Attending Fertilization or Artificial Activation of Sea Urchin Eggs," *Experimental Cell Research* 172, 1: 32-42 (Sep. 1, 1987). XP024858354.

Bronzi, et al. "Present and Future Sturgeon and Caviar Production and Marketing: A Global Market Overview," *Journal of Applied Ichthyology* 30: 1536-1546 (Oct. 6, 2014).

Chebanov, et al. "Sturgeon Hatchery Practices and Management for Release," *Fisheries and Aquaculture Technical Paper* 570 (Dec. 2011).

Huang, et al. "Effect of Synthetic Preservatives on Volatile Flavor Compounds in Caviar of Sturgeon", *Food Science* 36, 12: 97-103 (Dec. 2015).

Siddique, et al. "A Review of the Structure of Sturgeon Egg Membrances and of the Associated Terminology," *Journal of Applied Ichthyology* 30: 1-10 (Oct. 6, 2014).

Tosti, et al. "Electrical Events During Gamete Maturation and Fertilization in Animals and Humans," *Human Reproduction Update* 10, 1: 54-65 (Dec. 2004).

Szczepkowski, et al. "A Simple Method for Collecting Sturgeon Eggs Using a Catheter," *Archives of Polish Fisheries* 19: 123-128 (Jun. 30, 2011).

Katsiadaki, et al. "Assessment of Quality of Cod Roes and Relationship between Quality and Maturity Stage," *Journal of the Science of Food and Agriculture* 79: 1249-1259 (Dec. 1999).

Xiaomei, Li, "Correlation Analysis between Measured Values of the Texture Analyzer and Scale Values of Sensory Evaluation for Food Hardness"; *Advanced Materials Research*; Jan. 20, 2011; pp. 882-886; vols. 183-185; ISSN: 1662-8985; Trans Tech Publications Ltd; Switzerland.

Stable Micro Systems; "Texture Measurement of Meat and Meat Products"; *Texture Analysis Application Overview*, May 2015; pp. 1-14; Stable Micro Systems; Surrey, United Kingdom.

Debus, L. et al.; "Ultrastructure of the oocyte envelopes of some Eurasian acipenserids"; *Journal of Applied Ichthyology*; Dec. 2008; pp. 57-64; vol. 24, Suppl. 1; ISSN 0175-8659; Blackwell Verlag; Berlin, Germany.

Babin, Patrick J. et al.; *The Fish Oocyte: From Basic Studies to Biotechnological Applications*; Dec. 2007; pp. 1-75; ISBN 978-1-4020-6234-6; Springer Publisher; Dordrecht, The Netherlands.

Gao, Yang, et al.; "Effects of pH on Fertilization and the Hatching Rates of Far Eastern Catfish Silurus asotus"; *Fisheries and Aquatic Sciences*; Nov. 20, 2011; pp. 417-420; vol. 14, No. 4; The Korean Society of Fisheries and Aquatic Science; Canadian Science Publishing; Ottawa, Canada.

Ken Muldrew, et al.; "Mechanisms of intracellular ice formation"; Department of Pathology, University of Alberta, Edmonton, Alberta T6G 2R7 Canada, p. *Biophysical Journal*, Mar. 1990, pp. 525-532, vol. 57.

Department of Health and Human Services—Public Health Service—Food and Drug Administration—Center for Food Safety and Applied Nutrition—Office of Food Safety: "Fish and fishery Products—Hazards and Control Guidance"; Jun. 2022 Edition.

Arvind D. Diwan, et al.; "Cryobanking of Fish and Shellfish Egg, Embryos and Larvae: An Overview"; p. *frontiers in Marine Science*, May 7, 2020, pp. 1-18, vol. 7, doi: 10.3389/fmars.2020.00251.

Osman Erkmen, et al.; "Spoilage of Fish and Other Seafoods"; p. *Food Microbiology: Principles into Practice*, p. 301-306, First Edition—Dec. 2016 by John Wiley & Sons Ltd.

Oregon State University, "Fish Eggs for Bait and Caviar," <https://seafood.oregonstate.edu/sites/agscid7/files/snic/fish-eggs-for-caviar-and-bait.pdf>, Agricultural and Natural Sciences University of California, Davis Sea Grant Marine Advisory Program, Leaflet W-21114, Jan. 2005.

Berghofer, E., "Zusatzstoffe, Aromen und Enzyme in der Lebensmittelindustrie," Bundeministerium fuer Gesundheit, ISBN 978-3-902611-40-6, Vienna, Austria (Aug. 2010).

* cited by examiner

| Layers of the egg envelope | ZRI Mv | ZRI Std | ZRE Mv | ZRE Std | SS Mv | SS Std | AL Mv | AL Std |
|---|---|---|---|---|---|---|---|---|
| Control untreated | 21.2 | 6.0 | 32.9 | 7.5 | 0.0 | 0.0 | 64.2 | 9.6 |
| K⁺ from potassium citrate | | | | | | | | |
| K⁺ 0.1 mmol/l | 18.0 | 5.5 | 24.8 | 4.7 | 6.3 | 0.6 | 72.2 | 16.4 |
| K⁺ 0.5 mmol/l | 20.5 | 5.3 | 28.9 | 5.3 | 6.9 | 1.0 | 97.4 | 29.7 |
| K⁺ 1.0 mmol/l | 18.8 | 4.4 | 19.0 | 3.0 | 12.6 | 1.5 | 77.3 | 3.7 |
| K⁺ 1.5 mmol/l | 17.5 | 2.5 | 27.7 | 5.8 | 12.5 | 3.7 | 73.2 | 13.5 |
| K⁺ 0.5 mmol/l + Ca⁺⁺ 0.8 mmol/l | 17.3 | 1.8 | 27.3 | 3.8 | 12.0 | 1.9 | 67.4 | 8.9 |
| WO 2007/045233 A1 | | | | | | | | |
| Ca⁺⁺ 0.4 mmol/l | 16.7 | 4.7 | 27.7 | 5.1 | 0.0 | 0.0 | 92.0 | 17.6 |
| Ca⁺⁺ 0.8 mmol/l | 21.0 | 3.9 | 27.0 | 6.4 | 0.0 | 0.0 | 92.4 | 25.3 |

Fig. 2

| Layers of the egg envelope | ZRI Mv | ZRI Std | ZRE Mv | ZRE Std | SS Mv | SS Std | AL Mv | AL Std |
|---|---|---|---|---|---|---|---|---|
| Control untreated | 12.6 | 1.9 | 9.8 | 1.7 | 0.0 | 0.0 | 37.6 | 5.9 |
| K$^+$ from potassium citrate | | | | | | | | |
| K$^+$ 0.5 mmol/l | 15.7 | 0.4 | 15.0 | 2.4 | 13.2 | 1.8 | 61.8 | 9.2 |
| K$^+$ 0.65 mmol/l | 17.0 | 3.2 | 13.8 | 2.4 | 17.0 | 2.1 | 60.0 | 8.2 |
| K$^+$ 0.65 mmol/l + Ca$^{++}$ 1.6 mmol/l | 13.1 | 1.5 | 12.0 | 2.4 | 10.7 | 0.0 | 53.5 | 9.2 |

Fig. 3

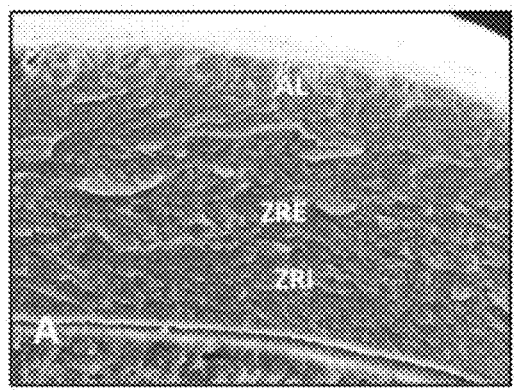
Prior art
Fig. 4A
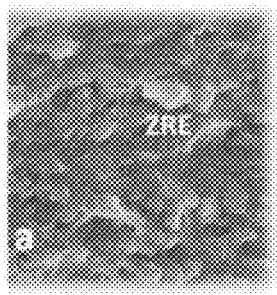
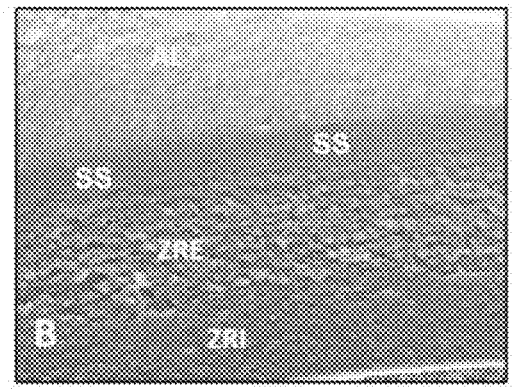
Fig. 4B
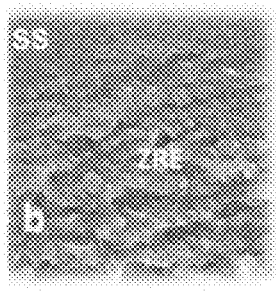
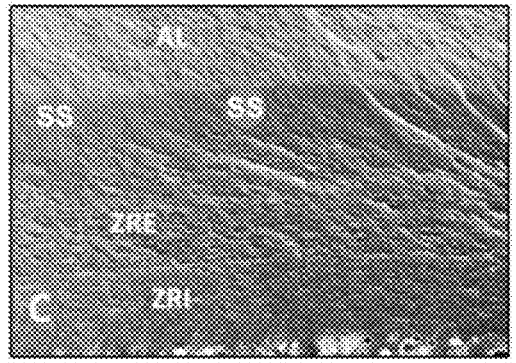
Fig. 4C
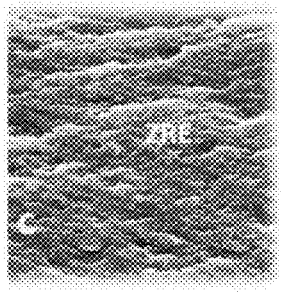
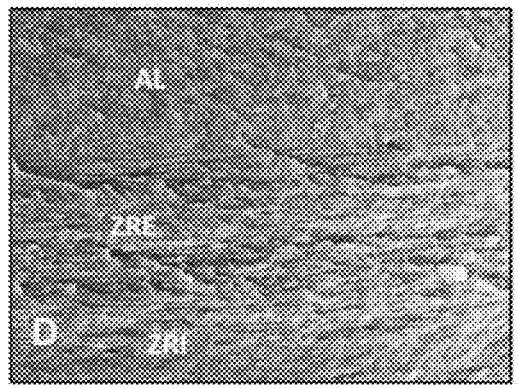
Prior art
Fig. 4D
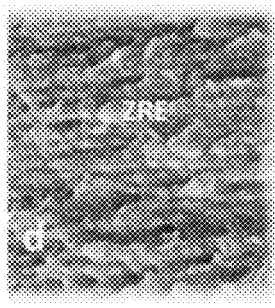

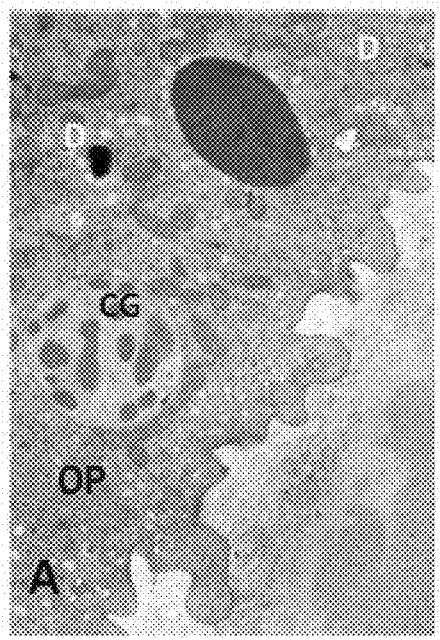
Fig.6A Prior art
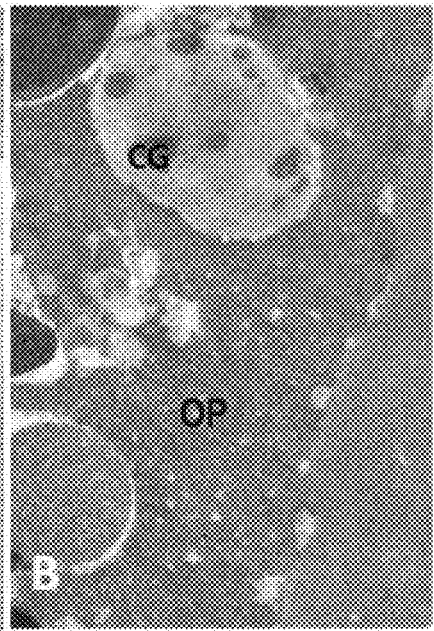
Fig.6B
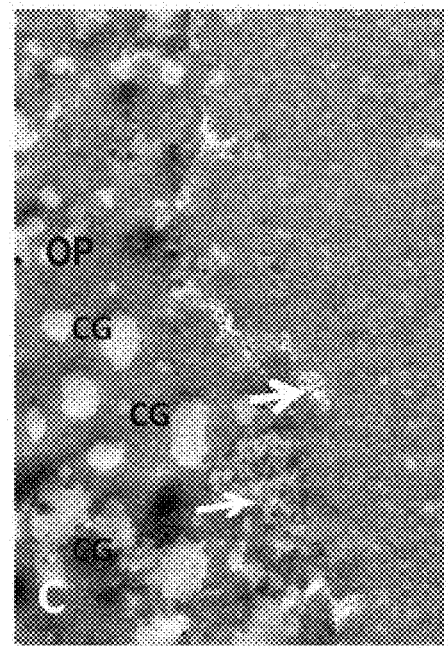
Fig.6C
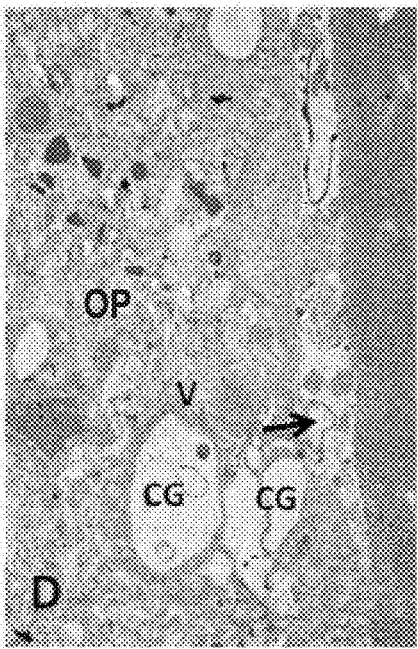
Prior art Fig.6D Fig.7A Prior art     Prior art Fig.7B Prior art Fig.8B

METHOD FOR PRODUCING CAVIAR OR A CAVIAR-LIKE PRODUCT FROM LIVE MATURE EGGS OF FISH OR CRUSTACEANS

CROSS-REFERENCE TO RELATED APPLICATIONS

This application claims the benefit of U.S. Provisional Application 62/780,356, filed Dec. 17, 2018, which is hereby incorporated by reference in its entirety herein.

FIELD

The invention relates to a method for producing caviar or a caviar-like product from live, mature eggs of fish or crustaceans, and such products.

BACKGROUND

The prepared, unfertilized eggs, especially from fish, are regarded as a delicacy and are increasingly consumed. The term "roe" is used to describe (in layman's terms) eggs at any stage of maturity, i.e. from immature to mature, whereas the degree of egg development is not clearly defined. "Spawn" refers to live, mature eggs laid by a female fish, lobster or other aquatic animal in water to be fertilized. Ovulated eggs are mature, fertile, live eggs which are released from the follicle cells in the ovaries and released into the body cavity. From there, they are then spawned or stripped. Caviar may be produced only from roe of female fish of the various sturgeon species in accordance with FAO Codex *Alimentarius*. In addition to the wild sturgeons, sturgeons bred in freshwater aquaculture facilities are now also used for caviar production. Sturgeon spawning occurs only in fresh water except for a few exceptions. The best-known sturgeon species (Acipenseridae) include *A. baerii, A. guldenstaedtii, Huso* (also known as Beluga sturgeon), *A. transmontanus, A. ruthenus* and its albino. However, the hybrids between *A. schrenckii* (female) and *A. dauricus* (male) and the American "Paddlefish" (Polydon spatula) closely related to the sturgeons are also to be named. Various types of caviar are known on the market, such as Sevruga, Osietra and Beluga. The white caviar (also known as "golden caviar") is obtained from albino sturgeon. The species *A. ruthenus* albino is occasionally used in aquaculture facilities to produce the so-called "Tsar caviar". However, this is not the "real Tsar caviar" which originates from the albino of the *Huso huso* and is very rare.

Currently, caviar-like products produced from approximately 38 further fish species that do not belong to the sturgeon species are produced and marketed, see, for example, the publication by P Bronzi et al.: "Present and future sturgeon and caviar production and marketing: A global market overview" (Journal of Applied Ichthyology 2014, 30 SI, 6, 1536-1546). These include tuna, lumpfish, salmon, trout, herring, cod, carp, whitefish and capelin, the immature roe of which is used to make caviar-like products (also known as 'caviar substitutes' or 'false caviar'). The roe from lobster, large crayfish and other crustaceans can also be processed into caviar-like products. The method claimed by the invention and the products that can be produced refer to these fish and crustaceans (as well as other suitable but not mentioned fish and crustaceans). Unless caviar from sturgeon is explicitly mentioned, caviar as well as caviar-like products from fish other than sturgeon and from crustaceans, in particular lobsters and crayfish, are regularly meant and comprised in the following.

Caviar and caviar-like products are valuable foods. Caviar is rich in protein with a high content of essential amino acids and fat. Caviar contains the vitamins D, E, B12 and niacin, the minerals sodium, potassium, magnesium and calcium as well as the trace elements phosphorus, fluorine, iodine and zinc. Moreover, it has a high content of valuable cholesterol (HDL). Caviar and caviar-like products can be used both as food and as a substance in the cosmetic industry or in other industries which work with such valuable substances. The size and firmness of the eggs are highly dependent on the type of fish or crustacean in question as well as on maturity and thus on the time of harvest.

There are currently some caviar products on the market made from mature, ovulated eggs from sturgeon. Nowadays, however, mainly caviar is still offered which is immature roe removed together with the ovaries from killed sturgeons. This is the conventional caviar extraction method. In the case of caviar from aquaculture sturgeons, it was initially assumed that here too—as in the case of wild caviar in the past—the immature eggs had sufficient strength without further treatment against the invasive washing steps to remove the remains of the gonad tissue and for the repackaging. However, experience gained over the past 20 years in the extraction of caviar from aquaculture sturgeon has shown that this immature roe from dead aquaculture sturgeon is too soft and can only be further processed by the use of borax or other preservatives or pasteurization into a product suitable for repackaging and with a shelf life for more than 2 to 3 months.

The killing of females to extract caviar from wild catches, combined with drastic overfishing, industrial, agricultural and domestic waste water pollution of the waters and the construction of weirs and dams blocking migration routes to freshwater spawning grounds, has led to a massive threat to the wild populations of approximately 27 different sturgeon species. In many regions poaching and illegal black trade still prevail despite the protection of sturgeons by the Washington Convention on International Trade in Endangered Species of Wild Fauna and Flora (CITES). Cost-intensive repopulating programs have been initiated worldwide which, however, according to reports by the World Sturgeon Conservation Society, are unfortunately showing little success above all in China, but also in Iran and Russia. Only the measures for preserving and repopulating the stocks in the USA and Canada are showing initial success. In addition to the permitted capture of spawning animals, various species of sturgeon from aquaculture are also released into the wild with varying degrees of success as part of conservation programs to save stocks threatened with extinction. Crayfish and noble crayfish populations are also severely threatened by environmental pollution and imported diseases such as the crayfish plague. Decisive progress in crayfish farming in aquaculture and extensive stocking measures play an important role in the conservation of indigenous stocks. In aquaculture, the female animals are kept alive for breeding and the eggs are obtained by stripping. However, in aquaculture caviar production, female sturgeons are usually simply killed in the conventional way because more gentle methods are not mastered. This completely disregards the fact that they show a considerably improved reproductive performance with increasing age. The "Cesarean section method", which is also partially practiced in Russia, is by no means one of the gentle methods, as it is associated with a high mortality rate of the sturgeons treated in this way.

From RU 2 232 523 C2 a method for producing granular caviar from ovulated sturgeon roe is known. The harvested ovulated eggs are initially treated in a hot, 1.5 percent to 2 percent aqueous solution of a preservative to prepare them for subsequent pasteurization at temperatures of 65° C. to 70° C. Apart from the fact that each heating process has a significant effect on the taste of the roe, the use of ovulated eggs, which have a very soft and sticky egg envelope, does not guarantee that they will withstand subsequent treatments with preservatives without bursting. However, even a small fraction of burst eggs significantly deteriorates the quality of the caviar, since the burst eggs are difficult to remove. Pasteurization results in denaturation of the valuable proteins and gives the caviar a mealy flavor.

In connection with the extraction of ovulated eggs from sturgeon, for example, from the publication by M. Szczepkowski et al.: "A simple method for collecting sturgeon eggs using a catheter" (Arch. Pole. Fich. (2011) 19:123-128) the use a catheter for this purpose is known. As a result, the eggs can easily be removed or sucked off by a vacuum. It is also known to simply massage the eggs out of the abdominal cavity of the sturgeon. This method is referred to as "stripping" and is the most gentle harvesting method.

In WO 2007/045233 A1, a method is described for producing caviar or caviar-like products from mature ovulated but unfertilized eggs of aquatic animals, preferably fish, by means of exogenous treatment of the mature eggs in a solution, wherein an endogenous, morphological change of the egg envelope, which separates the egg cell (egg plasma with surrounding plasma membrane) from the environment is brought about with structural stabilization. The solution used contains water and at least one cationic component (calcium cations $Ca^{++}$) which is dissolved in water at a predetermined concentration and induces structural stabilization upon contact with the eggs. Calcium is a cellular signal transduction molecule which induces a calcium wave in the egg cell in its egg plasma, which in turn leads to a cortical reaction and to the discharge and activation of ovoperoxidase. This enzyme ensures irreversible structural cross-linking of protein strands in the in the specific layers of the egg envelope, the *zona radiata interna* and the *zona radiata externa*, by the incorporation of tyrosine molecules. The induced process in the live egg having metabolism thus leads to the desired structural stabilization of the egg envelope. Such stabilization cannot be brought about in immature eggs because the corresponding receptors and enzyme cascades have not yet matured. In the case of killed eggs, the process cannot be initiated at all, since metabolism no longer takes place. Living, mature eggs immediately form a sticky layer due to the ovarian fluid when they come into contact with water so that they can stick to stones and plants in the spawning area. The eggs are therefore rinsed in a non-living ("physiological") saline solution prior to treatment in order to remove the ovarian liquid. Furthermore, the live, mature eggs have a natural potassium content in the egg plasma. For example, no harmful doses of potassium (e.g. to trigger ovulation) were added to them from outside before harvesting.

The reaction chain described is referred to in the literature as the "second reaction". This is a slow metabolic reaction which, after the fusion of a first sperm with the egg, creates a permanent physical-mechanical structure to protect the egg against other sperm aggregated outside the egg (polyspermy), but above all against environmental toxins, microbes and mechanical damage to the emerging embryo. In the known method, this second reaction is initiated without fertilization by a sperm having taken place. The structural stabilization achieved provides a "plop effect" and explosive discharge of the liquid egg plasma upon consumption of the product. The preference for a specific strength of the plop effect is highly dependent on the use of the caviar and on the consumer.

Furthermore, it is known from EP 2 522 226 B1 to preserve the immature roe of fish reared in aquaculture in a composition of the flavonoid and antioxidant Taxifolin (Dihydroquercetin) and an organic salt, in particular potassium citrate. However, the high concentrations of the composition used lead to blatant changes in the intracellular ion environment, which initiate the programmed cell death (apoptosis). The roe treated in this way is therefore killed immediately. The publications SU 1662469 A1 and RU 2 048 111 C1 also show methods for the preservation of sturgeon eggs in which potassium compounds are used in such enormously high concentrations that apoptosis is immediately triggered in the eggs and they die off. The same also applies to the EP 2 868 207 B1 corresponding to the above-mentioned RU 2 232 523 C2, wherein an additional denaturation by heating takes place.

The publication by G. E. Bledsoe et al.: "Caviars and Fish Roe products" (critical Reviews in Food Science and Nutrition, Vol. 43, No. 3, May 1, 2003, pages 317 to 356) discloses the use of potassium nitrate in the context of the application of nitrate as a general preservative for eggs of crabs, sturgeons and other fish. However, this takes place—as is customary in all preservation processes—at such high concentrations that a cell-toxic effect occurs which significantly disrupts the osmotic balance and immediately kills the treated eggs. Furthermore, only immature eggs in an early stage of development are preserved by slaughtered fish, which on the one hand have to be rubbed mechanically out of the gonads, accepting possible damage, and on the other hand do not yet have any fully developed structures in the mature egg envelope, so that they cannot be used in the invention.

DE 2 416 685 A discloses a method for the improved preservation of the red color when preserving salmon roe or salmon by adding a food additive in the form of citrate which is permitted under food law. After completion of the method, the latter remains detectable in the final product and changes its composition. The high concentrations used (5 to 10 weight percent) kill the live eggs immediately upon contact. Only because immature roe is used can it be rinsed with water. As already mentioned, mature roe would form a sticky gel layer. Freezing immature eggs both before and after preservation always leads to freezing damage to the egg envelope and egg plasma membrane and to hardening water loss, because the undeveloped and unstabilized egg envelope cannot protect the egg. JP S63-36 763 A discloses a method for reducing sodium chloride in the preservation of fish roe in order to reduce the salty taste. The sodium chloride is also substituted by various potassium compounds. However, this occurs again in such high concentrations that the eggs, which are immature eggs, are killed and are no longer able to perform metabolic work. JP 2001-299 285 A discloses a method for treating roe frozen in an immature state in order to improve texture. The eggs are rinsed at 5° C. for up to 24 h and using potassium-containing chemicals. Such a long treatment duration interrupts every metabolic process. Since the roe was frozen without protection against freezing, the immature eggs no longer have any metabolic activity and are also not fertile. They cannot therefore be used for the claimed invention either. The method claimed by the invention is not, however, concerned with subsequent and killing preservation, decolorization or freezing, but with the original production of caviar and caviar-like products from untreated mature live eggs. Preservation or freezing after treatment of the live eggs is only an optional additional step in the invention. Decolorization is completely dispensed with, since it is not necessary.

From the publication by Huang Hui et al.: "Effect of Synthetic Preservatives on Volatile Flavor Compounds in Caviar of Sturgeon" (*Huso dauricus x A. schrenckii*) ([J] FOOD SCIENCE, 2015, 36(12): 97-103), it is known that it is preferable to prevent loss of taste during the cool storage of caviar by synthetic preservation with the preservatives potassium sorbate (E202, sorbic acid) and ascorbate (vitamin C). A constant 0.5 per mil potassium sorbate was used in various test groups. Immature eggs were used which are to obtain a more intense taste as a result of the preservative treatment. Potassium sorbate is considered to inhibit mold growth and fermentation but can also impair the taste of a product.

The publication by L. Dufresne et al.: "Kinetics of actin assembly attending fertilization or artificial activation of sea urchin eggs" (Experimental Cell Research, Elsevier, Amsterdam, NL, vol. 172, No. 1, September 1987, pages 32 to 42) deals with the artificial activation of eggs of sea urchins. Although the present invention does not deal with the treatment of sea urchin eggs, because they do not show a suitable structure (only an egg envelope with two layers), this publication will be briefly discussed here. On the one hand, sea urchin eggs are used which were obtained by injecting a solution of 0.5 M KCl with an extremely high potassium chloride concentration into the abdominal cavity of the sea urchin. As a result, the egg has already been strongly influenced in its electrical polarization state and its natural potassium content in the egg plasma was evidently altered. Furthermore, all the sea urchin eggs come into contact with water before the treatment and form a gel layer which has to be subsequently mechanically removed. This fundamentally changes the morphological and physiological properties of the egg envelope as well. The sea urchin eggs cannot be used in the invention not only because of their fundamentally different structure, but also because of the massive metabolic interventions with potassium chloride during their harvest. Furthermore, calcium-free seawater is not deionized, it contains, among other things, more than 10 g of sodium, 0.43 g of potassium and 1.3 g of magnesium and 20 g of chlorine per liter. Thus, rinsing the eggs in calcium-free water does not correspond to rinsing in a physiological saline solution that does not harm the living, mature eggs.

The structure of the of fish and crustaceans follows a basic pattern and is described for the method in accordance with the terminology of the publication by Siddique et al.: "A review of the structure of sturgeon egg membranes and of the associated terminology", (J. Appl. Ichthyol. (2014), 1-10). The following is a brief description of how to establish a conceptual concordance.

In maturing eggs (oocytes, egg cells) in the ovaries of the animal, the follicle, consisting of granulosa cells (also known as follicular cells, follicular membrane, follicular epithelium) and thecal cells (also known theca interna and externa), surrounds the egg to supply it with signaling substances and nutrients. Between the granulosa cells and the thecal cells there is also the base lamina (in science also called perifollicular membrane, membrane, basal lamina). The egg plasma (oocyte plasma, olemna, cytoplasm, inner egg) is surrounded by the egg membrane (oocyte membrane, plasma membrane, cellular egg envelope). During ovulation, the egg is removed from the follicular cells and released into the abdominal cavity of the fish. The ovulated egg only retains its acellular egg envelope(also known in science as extracellular matrix or extracellular coat), which was formed during egg maturation and is structurally built from the outside to the inside from:

Alveolar layer AL (also referred to in science as gel coat, adhesive layer, gel envelope, (second external) gelatinous envelope, layer 3, chorion (2)), outermost layer of the egg envelope

*Zona radiata externa* ZRE (in science also referred to as external vitelline envelope *zona radiata*=vitelline envelope), outer vitelline zone, external vitelline membrane, layer 2, chorion layer 2, *zona pellucida externa* lat., *zona radiata externa* lat., layer 1 B of envelope, second envelope), outer part of vitelline envelope)lies directly under the alveolar layer Epilayer EP (in science also referred to as epilayer, layer,), separates the ZRE from the ZRI, not present in all types of eggs

*Zona radiata interna* ZRI (in science also referred to as internal vitelline envelope, inner vitelline zone, internal vitelline membrane, chorion layer 1, *zona pellucida Interna* lat., *zona radiata Interna* lat., layer 1A of the envelope, inner layer of the first envelope), inner part of the vitelline envelope, closely connected to the ZRE and perivitelline gap (in science also referred to as extra oocyte matrix, gap with the microvilli protuberances of the egg plasma), narrow space between the ZRI and the plasma membrane of the egg, into which the egg plasma inserts numerous microvilli (MV).

Live ovulated egg cells are electrically excitable by ion channels located in their plasma membrane. Changes in the electrical properties of the plasma membrane constitute, among other things, a prerequisite for egg activation and have an effect on the egg envelope. Pioneering work on marine invertebrates demonstrated ion currents of potassium cations through the egg plasma membrane, which cause a temporary change of potential across the plasma membrane (fertilization potential FP). This potential is generated by the activation of a transient voltage-dependent inward current into the egg interior. Depolarization of the plasma membrane potential (RP) was shown to result from ion flow through the egg plasma membrane (ion current (fertilization current FC)). This current flows through the openings of non-specific and highly conductive ion channels, which can be activated by sperm or artificial chemical or mechanical effects. The hypothetical models for the role of different ion channels and the relevant ions to date show species-specific differences.

In egg cells, potassium plays a central role in nature, compare the publication by E. Tosti et al: "Electrical events during gamete maturation and fertilization in animals and humans" (2004 Human Reproduction Update, vol. 10, no. pp 53-65). Potassium $K^+$ is the cation which decisively determines the resting potential of the egg cell. The potassium$^+$ gradient and the permeability of the egg for ions are regulated by transport proteins and ion channels. The natural intracellular potassium cation concentrations are 50 mmol/l in mature, unfertilized eggs of the sturgeon *A. baerii* according to studies at the Alfred Wegener Institute. Extracellular calcium, on the other hand, does not affect the resting potential/fertilization potential of the egg and is also not involved in the first fast electrical block (see below) itself.

The ion composition in the interior of the egg cell is different from the ion composition in the surrounding environment. This separation between cell interior and external medium must be maintained for metabolic activity and thus for cell survival. The different distribution of electric charges inside and outside the cell forms an electrical gradient across the egg plasma membrane, which can be measured as a potential difference (resting potential).

SUMMARY

In an embodiment, the present invention provides a method for producing caviar or a caviar-like product from live, mature eggs of fish or crustaceans, wherein the live, mature eggs are in a fertile but unfertilized state and have a natural potassium content in the egg plasma. The method comprises: treating the live, mature eggs in a saline solution which does not damage the eggs and subsequently treating the live, mature eggs in a solution of water and potassium in a concentration which does not damage the live, mature eggs and does not change the eggs' potassium content, wherein the water is deionized prior to the addition of a potassium donor for forming a cationic component in the solution, wherein the solution has a temperature that does not damage the live, mature eggs, and wherein the live, mature eggs are treated in the solution for a duration of a potassium exposure time until an egg envelope of the live, mature eggs obtains a desired elastic stabilization.

BRIEF DESCRIPTION OF DRAWINGS

The figures show in

DETAILED DESCRIPTION OF THE INVENTION

Figures 1A, 1B, 1C:
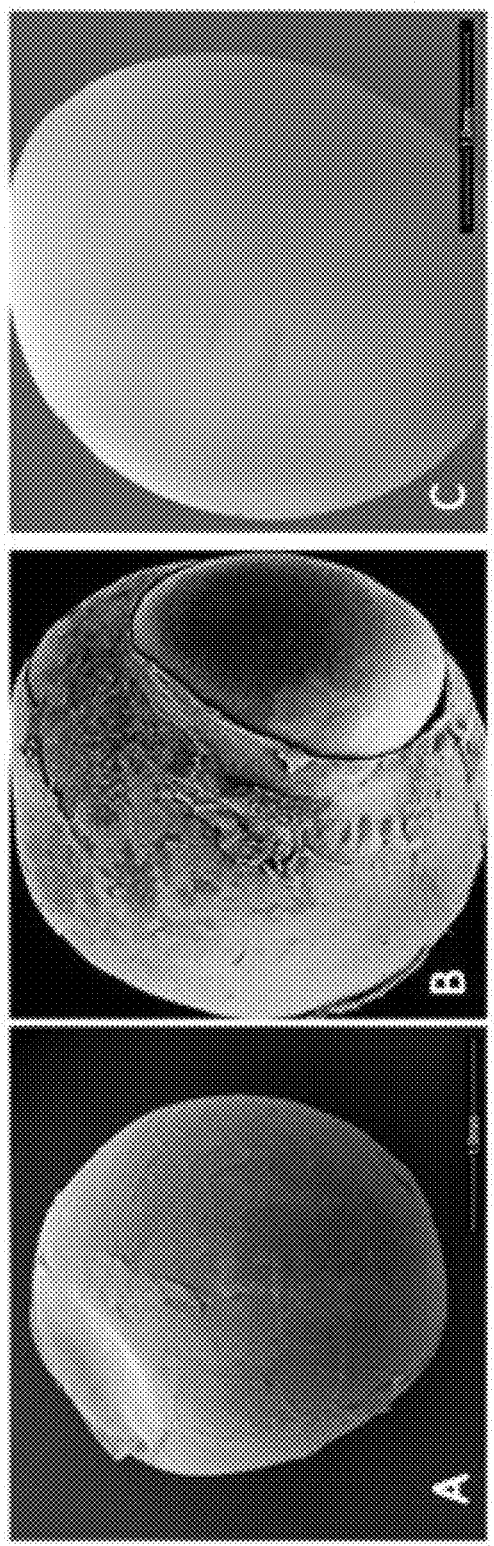
FIGS. 1A, B, C SEM images for comparing obtained live eggs in the immature and in the mature state (prior art), FIG. 2 an initial table of measurements of thickness of the layers of the egg envelope during treatment of live, mature eggs from Siberian sturgeon, FIG. 3 a second table of measurements of the thickness of the layers of the egg envelope during the treatment of live, mature eggs from the Beluga sturgeon, FIGS. 4A, B, C, D SEM images of the treatment series for forming the stabilizing layer of differently treated live, mature eggs of sturgeon with potassium cation treatment compared to the double treatment with potassium and calcium cations as well as calcium cations alone, FIGS. 5A, B, C, D TEM images of the structure of the layers of the egg envelope with the formation of the new stabilization layer between the *zona radiata externa* and the alveolar layer, FIGS. 6A, B, C, D TEM images of the cortical granules in the cytoplasm of untreated and differently (only potassium cations, double treatment with potassium and calcium cations, only calcium cations) treated mature sturgeon eggs, FIGS. 7A, B, C, D light microscopic images of untreated mature eggs of the Siberian sturgeon and of live, mature eggs from the Siberian sturgeon treated with potassium ions, FIGS. 8A, B, C, D light microscopic images of live, mature eggs of the Siberian sturgeon treated with calcium cations and of live, mature eggs treated with potassium cations and with calcium cations, and FIGS. 9A, B SEM and light microscopic images of the structure of the egg envelope of the Beluga sturgeon after treatment of the live, mature eggs with potassium and calcium cations.

Embodiments of the invention relate to a method used for the production of caviar or a caviar-like product, from live, mature fish eggs or crustaceans, wherein the live, mature eggs are in a fertile but unfertilized state and have a natural potassium content in the egg plasma, by means of treatment of the live, mature egg in a saline physiological solution which does not damage them and then in at least one solution containing water and at least one cationic component dissolved in it which brings about stabilization of the egg envelope of the live, mature eggs, and to caviar or a caviar-like product.

A method for the production of caviar or a caviar-like product based on live, mature eggs of fish or crustaceans is characterized in accordance with an embodiment of the invention in that in a potassium exposure step potassium is dissolved in the water as a cationic component in a concentration which does not damage the live, mature eggs and does not change their natural potassium content, wherein the water is deionized prior to the addition of a potassium donor for the formation of the cationic component and has a physiological temperature not damaging the live, mature eggs, and that the live, mature eggs are treated in the solution for a potassium exposure time until a desired elastic stabilization of the egg envelope for caviar processing is achieved.

In an embodiment of the invention, live, mature eggs are used which can be obtained naturally without damaging the fish or the crustacean. The live, mature eggs are fertile, but unfertilized. The ovarian fluid was removed by a previous rinsing with a physiological saline solution that does not harm the live, mature eggs, so that no sticky gel layer can form on the egg surface. In addition, the eggs have a natural, unaltered potassium content. Only cell-physiologically effective concentrations of potassium cations are used. The live eggs, which in fish and crustaceans in the egg envelope has more than two layers, i.e. three or more layers, are electrically activated. The starting product are live, mature, fertile, but unfertilized eggs with a fully functional metabolism, so that even the lowest concentrations of potassium cations, which cause no damage and leave no traces in the egg, can trigger transport processes through the egg membrane and metabolic processes in the egg plasma. The caviar or caviar-like products produced in this way exhibit a new texture with an advantageous stabilizing elasticity through a new hyaline, acellular layer (elastic stabilization layer) in the egg envelope, The desired degree of elastic stabilization can easily be determined by self-testing (degree of elasticity of the eggs) The texture may become somewhat softer at room temperature without limiting the stability of the caviar. The taste is pleasantly fresh and spicy, without being "fishy". The purity of the eggs used, even without the addition of preservatives such as borax, which is already banned in many countries, results in a long shelf life (9 to 12 months) at standard temperatures between $-2°$ C. and $-4°$ C. In caviar production, these eggs treated with this method can also be frozen without any loss of quality, resulting in enormous advantages in terms of storage and transport, see below.

By bringing the live, mature eggs into contact with the potassium cations ($K^+$) in physiological, i.e. non-damaging, concentration according to the invention, the eggs are changed within the framework of electrical events and the so-called "first reaction" is triggered, which leads in the shortest time (seconds to minutes) to the electrically induced removal of the stickiness upon contact with water and, in the further course of treatment, to the formation of a new, elastic stabilizing layer within the egg envelope. This new stabilizing layer gives the egg envelope elasticity, so that the invention already produces a caviar or caviar-like product of the highest quality at this stage, which can also be subjected to optional processing steps, in particular preservation and deep-freezing (at −18° C.) without any loss in quality.

An egg activation comprises and passes through a whole series of cell-biological cascades. The "second (slow) reaction" (slow block) with a cortical reaction used in WO 2007/045233 A1 is involves a calcium-dependent enzyme activation for the amplification and ultimately massive structural alteration of the egg envelope by irreversibly tyrosine-linked protein strands in the *zona radiata interna* and the *zona radiata externa*. In nature, this prepares the first cell division for embryonic development. By contrast, the "first (fast) reaction" (fast block, electrical block, fast electrical block) used in certain embodiments of the present invention with subsequent depolarization/hyperpolarization and its stabilization of different duration depending on the animal species is at the beginning of all cell-biological cascades. Both processes differ significantly regarding the substances used, namely A) potassium cations for rapid electrical blocking with depolarization of the egg membrane and the thus triggered egg activation and formation of a single, additional new zone in the egg envelope (formation of an elastic structuring layer) and B) calcium cations for slow mechanical blocking with an enzymatically controlled morphological conversion in the existing layers of the egg envelope (formation of a structural stabilization layer).

The first electrical event is rapid depolarization or even hyperpolarization within milliseconds and is intended to prevent attachment of supernumerous sperm to the egg after fertilization in nature. Rapid hyperpolarization is followed by a steady hyperpolarization within the following up to 60 min (in some types of aquatic animals such as lobsters, even up to 5 hours). Although the sperm remaining in the vicinity of the egg can still undergo attachment after the fast electrical block and remain stuck in the vitelline coat of the egg envelope (soft coat), it cannot penetrate through the plasma membrane of the egg for actual fertilization, as could be shown on mollusks. If potassium cation exposure continues in accordance with certain method embodiments according to the invention, the formation of a completely new, hyaline (translucent, glassy, gel-like) zone (elastic stabilizing layer) is observed in the live, fertile, but unfertilized and mature egg, which is unknown in the literature to date, which is GAG-positive (increased occurrence of glucosaminoglycans) and eosinophil (dyeable with the red, acidic diagnostic dye eosin) for the visualization of cell organelles, plasma proteins, connective tissue and its precursors), and in which sperm would get stuck. The formation of this elastic stabilizing layer is the first to take place within the continuous hyperpolarization of 10 s and more in partial areas over the cellular egg plasma membrane and, after completion, is located in the egg envelope between the *zona radiata externa* and the alveolar layer in live eggs with a structural design similar to that of fish and crustaceans (more than two layers in the egg envelope). The cause for the formation of the new elastic stabilization layer is seen in the continuous depolarization of the plasma membrane by the supply of potassium cations in physiological concentration according to invention.

According to EU legislation of the member states on food supplements, only the potassium compounds listed therein, such as potassium bicarbonate (potassium hydrogen carbonate, KHCO3) (CAS no. 298-14-6), potassium carbonate ($K_2CO_3$) (CAS no. 584-08-7), potassium citrate (CAS no. 6100-05-6), potassium hydroxide (KOH) (CAS no. 1310-58-3), potassium chloride (KCl) (CAS no. 7447-40-7), K, potassium iodide (KI) (CAS no. 7681-11-0), potassium iodate (KIO3) (CAS no. 7758-05-6), may be used for nutritional purposes. Similarly, the proposal for a Regulation of the European Parliament and of the Council of Nov. 10, 2003 (COM (2003) 671 final) allows these compounds to be added to food. Certain potassium compounds, such as potassium citrate (E 332), potassium lactate (E 326), potassium orthophosphates (E 340), may also be added to foods for technological purposes. The method of treatment of live, mature eggs of fish or crustaceans with potassium cations in concentrations compatible with cells (physiological concentration, i.e. not harmful to the egg) and without the formation of residues, according to the invention, allows caviar or caviar-like products to be produced which meet all national and international quality requirements by authorities, distributors and consumers. The studies on intracellular ion concentrations using optical emission spectroscopy (OES) in the cytoplasm of eggs at the Alfred Wegener Institute, in which potassium was used as a new substance for the continuous depolarization of the egg plasma membrane, show no changes in concentration in the egg plasma after treatment, even with different concentrations and duration of treatment. The potassium cations used in certain method embodiments according to the invention thus clearly apply as a processing aid. A processing aid is used in the industrial processing and production of foodstuffs. The processing aids are food additives which are added in order to facilitate technical processes such as cutting and filtering. In the end product, however, the processing aids must not be present at all or only in unavoidable (small) residues. In contrast to changing food additives which also have to be declared on the packaging, the processing aids must no longer have any effect in the end product, which is of particular advantage. Their use must be technically unavoidable, technologically ineffective, harmless to health and odorless and tasteless. Since the substances are no longer present or active in the treated foods, their use does not have to be labeled. This also applies to residues, reaction products or residual contents.

It is preferred and advantageous if at least one potassium salt, preferably the salt of citric acid (potassium citrate E332) and/or the salt of hydrochloric acid (potassium chloride E508) and/or the salt of sorbic acid (potassium sorbate E202) is dissolved in the water as potassium donor for the formation of the cationic component. Potassium donor is taken to mean a compound having potassium, which after its dissolution in water supplies the potassium cations, wherein its concentration in the water is determined by the concentration of the particular potassium compound and its structural formula. The potassium salts mentioned are even all approved as food additives with E numbers, although in certain embodiments of the invention they are used only as processing aids which no longer occur in the end product and are not subject to declaration. An advantageous and preferred concentration of the potassium cations in one solution with previously deionized water is between 0.1 mmol/l and 3.0 mmol/l, preferably 0.1 mmol/l, 0.5 mmol/l, 0.65 mmol/l, 1.6 mmol/l or 2.0 mmol/l, particularly preferably 1.0 mmol/l or 1.5 mmol/l in accordance with an embodiment. All margin and intermediate values (integer and non-integer) should also always be included in all ranges (also other parameters) made within the scope of this invention. In order to produce the potassium cation concentrations mentioned in the water, it must be deionized. However, since water molecules also decompose constantly in water, it is understood that only a degree of deionization can be achieved by technical means (electrical conductivity in water between 1 μS and 15 μS at 25° C. as a measure of the achievable deionization).

Furthermore, the potassium exposure time in the potassium exposure step is preferably and advantageously between 5 min and 30 min, preferably at 10 min, 12 min, 15 min, 20 min or 25 min. Other potassium exposure times in this range are also easily selectable. Exposure times of up to 50 min or more may even occur in the treatment of mature lobster eggs (crustacean). The formation of the new elastic stabilization layer, which modifies the egg envelope, starts already a few seconds (up to 10 s) after the start of the treatment. However, since the eggs do not all react simultaneously with a continuous depolarization and formation of the stabilization layer in partial regions of the surface of the egg envelope, an extended treatment time of up to 10 min is recommended to achieve continuous depolarization in all treated eggs. As the treatment time increases, the constituents of the stabilizing layer are discharged from the egg cell and are deposited between the *zona radiata externa* and the alveolar layer in the entire egg envelope around the egg. As a result, the live, mature eggs are elastically stabilized by the invention in such a way that they can be salted, repackaged and deep-frozen without problems.

As a further optional modification, certain embodiments of the method according to the invention, also provide an additional calcium exposure step, which can be carried out after the potassium exposure step or before it. The respective changes to the egg envelope occur independently of each other in both sequences in their described characteristics. In the separated calcium exposure step, calcium is preferably and advantageously dissolved in another solution with water as a cationic component in a concentration which does not damage the live, mature eggs (i.e. physiological), wherein the water is deionized before the addition of a calcium donor for the formation of the cationic component. The live, mature eggs are treated in the calcium exposure step until a desired structural stabilization of the egg envelope is achieved. The desired degree of structural stabilization can be readily determined by self-testing (degree of plop effect of the eggs). In the calcium exposure step, at least one calcium salt, preferably calcium citrate, calcium chloride and/or calcium sorbate, is advantageously and preferably used as calcium donor (calcium supplier, definition see potassium donor). Calcium salts are authorized in the European Union as food additives under the numbers E333 and E509 without a quantitative limit and E203 with a quantitative limit. In German, the spelling forms "Kalium (potassium)" and "Calcium" (not Kalzium) were chosen to better distinguish the use of the two ion types.

Calcium is already physiologically present in the egg cell and an essential component in the cell metabolism. It is known from WO 2007/045233 A1, which has already been referred to above, that calcium chloride is used to structurally strengthen the egg envelope by irreversibly cross-linking proteins through the incorporation of tyrosine molecules. In addition to the improved and adjustable elasticity of the egg envelope by potassium cations, which is basically achieved with the invention, it can above that still be structurally solidified mechanically by the calcium exposure step. Thus, an optimal, stabilizing combination can be achieved for certain caviar types and caviar substitutes. This is particularly advantageous for very large unstable eggs (larger than 3.2 mm in diameter, e.g. eggs from the Beluga sturgeon or the white sturgeon) or for those which are particularly soft when they are mature (maximum force less than or equal to 0.3 N until they burst in the hardness test, e.g. eggs from the Sterlet sturgeon). The application of both treatment steps results in a high-quality caviar or caviar-like product for eggs that are problematic (size, softness).

The concentration of the calcium cations in the other solution is advantageously between 0.1 mmol/l and 3.0 mmol/l, preferably 0.1 mmol/l, 0.5 mmol/l, 0.8 mmol/l, 1.0 mmol/l, 1.5 mmol/l, 1.6 mmol/l or 2.0 mmol/l. The calcium exposure time is preferably between 9 min and 30 min, preferably 10 min, 12.5 min, 15 min, 16 min, 20 min or 25 min. The choice of treatment duration should take account of the fact that the strength of the egg envelope increases steadily with increasing calcium exposure time until a limit value is reached. In nature, fertilized eggs from fish attain a strongly hardened egg envelope after approx. 60 minutes, which is no longer suitable for consumption. This may take up to 24 hours for the lobster.

An important process parameter in certain embodiments of the method according to the invention is the temperature of the solutions in which the mature eggs are treated. This is said to be physiological, which means that it does not influence the natural metabolic processes in the live eggs. In certain embodiments, the temperature of the solutions is always in the range of the natural spawning temperature of fish or crustaceans. This ensures that the electrical activation of the egg plasma membrane caused in the potassium exposure step is carried out reliably with depolarization starting at resting potential. In unnatural spawning temperatures, for example in fish or crustaceans from the polar regions above 15° C., no electrical egg activation occurs, and the live, mature eggs cannot be electrically or enzymatically stabilized. They become atretic. The same applies to the eggs of fish or crustaceans from the mixed and tropical zones. The basic rule is that at temperatures above 35° C., the degeneration of the solution results in a severe loss of quality in eggs.

In order to adapt the temperatures of the solutions to the natural habitats, the present invention broadly divides the life zones of fish and crustaceans, the eggs of which can be used, during the periods of natural reproduction into three climate zones: polar zones (at the poles), temperate zones (between the polar zones and the tropical zone), tropical zone (around the equator). The present invention prefers and advantageously exploits the fact that the temperature of one solution (potassium exposure) and/or of the other solution (calcium exposure) is taken from a polar temperature range between 1° C. and 15° C., preferably between 5° C. and 12° C., especially preferred 10° C., a moderate temperature range between 1° and 20° C., preferably 15° C., especially preferred 12° C., or a tropical temperature range between 20° C. and 29° C., preferably 27° C., especially preferred 21° C. The invention preferably avoids temperatures resulting in a metabolic change leading to degeneration and cell death of the eggs, as is the case, for example, with pasteurization by heating to temperatures above 40° C. The invention preferably avoids this at any point in the process.

Since the cation concentrations used in certain embodiments of the method according to the invention trigger animal-specific physiological reactions of electrical (potassium exposure) and metabolic (calcium exposure) nature and thus influence the processing resulting in a stable edible end product, it must always be assumed that deionized water is present in the solution in order to achieve an exact concentration of electrically (potassium) or metabolic (calcium) active cations (positively charged). It is therefore technically achievable and thus preferred and advantageous if the deionized water at 25° C. has an electrical conductivity between 1 µS/cm and 15 µS/cm, preferably 10 µS/cm or less, particularly preferred 1 µS/cm. Drinking water and well water, depending on the regional source, consist of a highly different composition of different ions, which may even have antagonistic effects on cell metabolism under certain circumstances. When the temperature is 25° C., the electrical conductivity of pure water, for example, is 0.055 µS/cm, deionized water 1 µS/cm, rainwater 50 µS/cm or drinking water 500 µS/cm. In order to be able to obtain reproducible results, it is important to know the deionized water in its electrical conductivity.

Since live cells in the form of activatable mature oocytes are treated with certain embodiments of the method according to the invention, it is also important, among other things, for the solutions to be adapted to the metabolism of the cells of the different animal species so that the metabolic processes induced in the method can also take place. It is therefore advantageous and preferred if the one and/or the other solution has a pH (physiological, not detrimental to the living organism) of between 6.8 and 8.0, preferably between 7.0 and 7.9, particularly preferred 7.2 or 7.4 or 7.5. In particular, the pH adjusted in the solution is relevant for the slow metabolic reaction in the calcium exposure step. Since enzymatic processes in the cell are highly regulated by the pH, the intracellular pH in the potassium exposure step (electrical process) was also examined. However, the pH in the egg plasma of the eggs treated with the various potassium-based substances at different concentrations and durations remains substantially unchanged in the pH optimum between 7 and 8 and shows the expected individual differences in the case of individual fish and crustaceans.

In embodiments of the invention, the different exposure steps are used to endogenously stabilize the egg envelope of the live, mature eggs themselves (elastically and optionally structurally). Thus, the caviar or the caviar-like product is already ready for further processing, such as salting and packaging. During ovulation, the live, mature, ovulated eggs are pushed out of the follicular cells so that no more tissue residues of blood vessels or follicular cell residues adhere, to which bacteria or fungi could colonize. Harvested ovulated eggs therefore have a fine purity and thus the best conditions for a long shelf life. This is reliably ensured if after the last exposure step a mild salting is carried out with 2.0% to 3.8%, preferably 3.5%, sodium chloride in relation to a quantity of caviar or caviar-like product. for preservation and flavor intensification. The sodium chloride should preferably be free of potassium and calcium donors, as are contained, for example, in anticaking aids, since this prevents uncontrolled changes in the egg envelope due to salting. Caviar from sturgeon eggs is dry salted with simple common salt (sodium chloride NaCl), wet salting is often carried out when roe from other fish species is processed into caviar-like products such as salmon and trout caviar. Salting in the specified area, which can optionally be carried out with the invention, is a very light salting process, also known as "malossol", which is a clear sign of high quality. Pasteurization or heating to a temperature of 60° C. and above is preferably dropped entirely for the caviar or caviar-like product claimed with the invention, as this is not necessary and would only harm the quality of the product and its sensory properties. As a result of malossol salting, the caviar or caviar-like products produced using the method in question have a minimum shelf-life of at least 9 to 12 months if stored at −2° C. It does not freeze in the process due to light salting.

A further improvement in the quality of the produced caviar or caviar-like product results from certain embodiments of the invention if, in accordance with a further modification, storage of the caviar or caviar-like product for maturation in air-tight glass containers for several months, preferably one to three months, is carried out preferentially and advantageously following preservation and intensification of flavor. The caviar "matures" through storage and, depending on the degree of maturity, gains in taste intensity. However, this maturation is to be seen in the sense of a further development of taste (as with cheese, for example) and has nothing to do with the "degree of maturity" of the mature eggs used in the invention in the sense of biological development. Here, maturity refers to the possibility of fertilization and thus to the development state of the live eggs. When the caviar matures in relation to taste, it is stored in glass containers, which provide sufficient space for the caviar to mature, since it is not pressed (as in the case of packaging in metal snap-on lid cans) and thus retains its taste-intensive oils. The caviar thus packaged in glass according to certain embodiments of the invention is not to be confused with pasteurized caviar, which is also frequently packaged in glass. Furthermore, storage in environmentally friendly glass containers avoids the often criticized metallic taste of caviar conventionally packaged in metal containers.

In accordance with the next modification of the process, it is preferable and advantageous to carry out freezing of the caviar or caviar-like product in a temperature range between −20° C. and −15° C., preferably at −18° C., following preservation and intensification of flavor or storage and maturation of flavor. Ideally, the caviar matures in taste for human consumption to the desired degree of maturity of the respective customer and is either freshly frozen after 14 days subsequent to production or after a maximum of 3-4 months of maturing. The caviar is either frozen in 500 g glass containers before the repackaging or after the repackaging for the end customer in 30 g, 50 g, 125 g, 250 g or 500 g (possibly up to 1000 g) glasses which can be vacuumed. Caviar obtained under conventional slaughter cannot be frozen. Although pasteurized or heated caviar can be frozen, it exhibits extreme quality losses due to heat treatment. The possibility of freezing the caviar or caviar-like product according to the invention enables optimal caviar marketing that meets the current demands of convenience food. Marketing has so far reached its limits due to the specific transport and storage temperatures of −2° C. to −4° C., which must be strictly adhered to, as these are not maintained by most suppliers. Therefore, conventionally obtained caviar is treated or pasteurized with harmful preservatives, such as borax, in order to preserve it for at least a period of 12 months and longer. However, the caviar produced with embodiments of the present invention can simply be frozen and thus stored and kept fresh for a longer period of time. Experiments have shown that caviar thawed slowly in the refrigerator at +4° C. to +7° C. does not lose taste or texture.

In certain embodiments of the invention, the eggs are treated in a solution bath (an aqueous solution, a solution with water). The eggs are added and left in the solution bath until—depending on the type of egg used—the desired degree of stabilization (elastic and possibly structural) has been achieved. The eggs are then simply removed from the bath. In order to reliably prevent an undesired further stabilization after removal by the cations in the still adhering solution, in certain embodiments of the invention it is preferable and advantageous, in accordance with a next modification of the method, if the removal of the respectively introduced cations from the mature eggs is carried out after achieving the desired elastic (and optionally structural) stabilization, to dip (briefly immerse) the live, mature eggs in a saline solution (physiological saline solution) that does not harm them. This rinses off the cations and immediately disrupts the stabilization processes they cause. The (desired)

degree of stabilization of the egg envelope achieved so far is reliably preserved as the final state.

The live, mature eggs used in certain embodiments of the invention are fertile but not fertilized. They are generally not wetted by water and have a natural potassium content in the egg plasma. Such live eggs can either be released from the gonads into the abdominal cavity of the fish and harvested from there via the genital opening. This can be done, for example, by natural spawning, by stripping (massage of the abdominal cavity from the outside) or by using a catheter through which the eggs are drained or sucked out of the abdominal cavity. Eggs released from the gonads into the abdominal cavity are referred to as ovulated eggs (maturity level 5), which are still surrounded by a slimy ovulation fluid. In order to avoid the formation of a sticky layer on the eggs upon contact with water, the ovulation fluid is rinsed off with physiological saline solution before starting the treatment. Ovulated eggs can be obtained from live animals, which is particularly sustainable. However, live, mature eggs of maturity levels 3 or 4 can also be used for the invention, which are taken from the dead animal in the gonads and then isolated. A good overview of the different maturity levels of cod is given in the publication by I. G. Katsiadaki et. al.: "Assessment of quality of cod roes and relationship between quality and maturity stage" (J. Sci Food Agric 79:1249-1259 (1999)) can be found there in particular in Table 1. A numerical definition of the degree of maturity is possible with the help of the so-called "polarization index". This is calculated from the ratio of the distance between cell nucleus and plasma membrane to the diameter of the egg between the animal and vegetative pole (large half-axis). In accordance with the next embodiment of the invention, it is therefore preferred and advantageous to treat live, mature eggs of fish or crustaceans with a polarization index PI of $0.05 \leq PI \leq 0.15$, preferably $0.05 \leq PI \leq 0.12$. Eggs with this PI are particularly suitable for harvesting for treatment according to the invention. Further information on the polarization index PI of eggs can be found, for example, in the sturgeon breeding guidelines (publication FAO Ankara 2011 Fisheries and Aquaculture Technical Paper 570 "Sturgeon Hatchery Practises and Management for Release—Guidelines").

The method claimed by the invention can be used to treat the live, mature eggs of fish and crustaceans (scientific name Crustacea) whose eggs have the basic structure required for the invention (more than two layers in the egg envelope) and which are suitable for consumption in the form of caviar or caviar-like products. It is preferable and advantageous to treat live, mature eggs from fish or crustaceans caught in the wild or from aquaculture, which have been ovulated and obtained by stripping or other targeted harvesting, such as catheterization. In doing so, for example, animals intended for restocking in the wild, such as from a restocking project, can also be harvested. The proceeds from the sale of caviar and caviar-like products can then be returned to the stocking measures. It is particularly preferred and advantageous if, in certain embodiments of the invention, live, mature eggs of still existing recent and natural living bony fish, preferably of live sturgeon species, are treated. Embodiments of the invention can then be used to produce (genuine) caviar of the highest quality. Other caviar-like products from lobsters or other crustaceans, e.g. crayfish, can also be produced to the highest quality with embodiments of the method according to the invention. Furthermore, very large (above 3.2 mm diameter) or soft, unstable eggs (texture in the hardness test below 0.3 N, above which the eggs burst) can be treated preferentially and advantageously, since embodiments of the method according to the invention can also optionally comprise two exposure steps with both elastic (electrically stimulated) and structural (enzymatically stimulated) stabilization of the egg envelope.

Finally, embodiments of the invention also include different products from live, mature eggs of fish or crustaceans, which can be produced with the claimed method but also with other methods. The products are characterized in that an elastic stabilization layer in the form of an eosinophilic, hyaline layer with incorporated glucosaminoglycans is additionally formed in the egg envelope. In this case, however, the live egg is unfertilized, which is why the elastic stabilization layer does not occur in nature. In certain embodiments of the invention, the elastic stabilization layer lies between the zona radiata interna and the alveolar layer, preferably between the zona radiata externa and the alveolar layer. It can therefore occur only in the case of live eggs with a more than two-layer structure of the egg envelope. Sea urchins, for example, only show exactly two layers within the egg envelope. The new stabilization layer is transparent, gel-like and elastic and can be histologically dyed red with eosin and blue with alcian. During production using certain embodiments of the invention, its characteristics are influenced by the potassium cation concentration used in the potassium exposure step and its position is influenced by the potassium exposure time.

To remove the ovarian fluid, the live, mature eggs are treated with a saline solution that does not harm the eggs prior to treatment. This is preferably and advantageously a physiological saline solution. Furthermore, it is advantageous and preferred if the saline solution is formed as 0.6 percent to 1.0 percent saline solution, particularly preferably as 0.9 percent saline solution. For example, to prepare a 0.9 percent saline solution, 9 g of sodium chloride (NaCl) are dissolved per 1 liter of water used. This concentration corresponds to the natural occurrence in the human organism, it is therefore called "physiological" saline solution.

Certain embodiments of the invention further relate to caviar or a caviar-like product of unfertilized, mature eggs of aquatic animals, characterized in that an irreversible cross-linking of protein strands by incorporated tyrosine molecules is additionally formed in the egg envelope. This additional irreversible cross-linking is located in the zona radiata interna and the zona radiata externa of the live eggs of fish or crustaceans. Irreversible cross-linking leads to additional structural stabilization of the egg envelope. Together with the existing elastic stabilization, it can also be used to treat particularly large or soft eggs. The caviar or the caviar-like product can be prepared according to embodiments of the invention, wherein the structural degree of stabilization in the egg envelope then depends on the calcium exposure time and the calcium cations concentration in the calcium exposure step. Other methods of making caviar or a caviar-like product with the same nature of irreversible protein cross-linking in the egg envelope are also applicable. Further embodiments of the methods and products of the invention can be found in the following specific description part relating to the exemplary embodiments, but in no way limit the scope of the present invention to such exemplary embodiments.

EXAMPLES

The following section explains in more detail the method of producing caviar or a caviar-like product from live, mature eggs of aquatic animals and such products according to certain embodiments of the invention and their advantageous modifications for a better understanding of the invention using exemplary embodiments and figures.

It is known from studies of the relationship between the weight and/or age of sturgeons and the size of the caviar grain or the quantity of caviar harvested that the ovoid diameter and thus the quality of the caviar increases with the weight and/or age of the sturgeon. Furthermore, the amount of caviar harvested increases with the increasing weight and age of the sturgeon and thus its economic success. Sturgeons do not become sexually mature in their natural environment until the age of 12 to 26 years, depending on the species. Most sturgeons spend the growth phase until their first reproduction in the sea or in estuaries and then migrate into the rivers to find their spawning grounds on stony ground in fresh water. But also, in aquaculture, sturgeons need approximately 5 to 16 years, depending on the sturgeon species, to reach the first sexual maturity and thus the first caviar harvest. In aquaculture, the repeated harvesting of caviar from live females over many years presupposes animal-friendly keeping of the fish with optimal feeding and low stocking density and is always economically and ecologically sensible due to its late sexual maturity and long lifespan. A production of caviar in the economically interesting ton range is easily possible in a coordinated workflow from harvest and treatment of the stripped eggs to caviar. Suitable upscaling measures can achieve a daily production of 80 kg and more depending on the age of the fish and the amount of caviar associated with it.

Certain embodiments of the invention use live, mature eggs that have previously been cleaned with physiological saline solution. These are ovulated eggs that have previously been squeezed out of the gonad by fine muscle fibers of the follicular cells due to their stage of maturity (stage of ovulation readiness and fertility), a process known as ovulation. The ovulated eggs are released into the fallopian tubes and the abdominal cavity of the fish and without cell residues and other residues. They can then be removed by massaging the abdomen without affecting the life of the fish. The completely clean surface of the eggs does not allow any niches or wrinkles for bacterial or fungal infestation, which results in a long shelf life of the caviar or caviar-like product. It is not necessary to use preservation methods such as borax, which is harmful to human health. FIGS. 1A, B, C show prior art scanning electron microscope (SEM) images of a live egg and the ovulation process. FIG. 1A shows an immature oocyte with follicular cells such as those found in conventional caviar from the killed sturgeon. FIG. 1B shows in situ ovulation and release of the mature egg cell from the surrounding follicular cells of the gonad. FIG. 1C then shows a live, mature ovulated sturgeon egg which is obviously completely smooth and clean.

In an exemplary embodiment with live, mature eggs after ovulation, a possible method workflow according to an embodiment of the invention is explained in more detail below with some optional additional steps:

Stripping of live female sturgeon from live eggs at maturity stage V after disintegration of the germinal vesicles, Immediate transport of the stripped live eggs together with the ovarian fluid to a caviar laboratory (waiting times are largely avoided, unavoidable waiting times are bridged on ice and under exclusion of oxygen by covering the ovarian fluid with an air-impermeable plastic foil), Immediate thorough rinsing of the live eggs in 0.9 percent physiological saline solution until the ovarian fluid is completely removed, Performing of the potassium exposure step:
Preparing a 0.1 to 2 millimolar potassium cation solution from potassium citrate (e.g., 1.0 mmol/l $K^+$, see FIG. 2) in deionized water having a conductivity of 10 μS/cm (at 25° C.) and a temperature in the polar temperature range of 10° C.,
Introducing the live, mature eggs into the solution for a potassium exposure time of 10 min and
Removing the treated eggs from the solution; and
Brief dipping of the treated eggs into a 0.9 percent physiological saline solution.

Other extraction methods for the mature eggs are also possible. Even with the use of live, mature eggs taken from a previously killed animal, blood and fat must be rinsed off or the eggs must even be rubbed out of the gonads, which is achieved by the pretreatment with a preferably physiological saline solution. By rinsing, the elasticity and the diameter of the stabilization layer can be additionally controlled (that is to say in addition to the selection of the duration of the exposure time). Due to the electrical influence of the introduced potassium cations, the described treatment effects the forming of a hyaline, elastic stabilization layer between the *zona radiata externa* and the alveolar layer in the egg envelope. In eggs of normal condition and softness, treatment with the potassium exposure step is sufficient. However, when particularly large, soft or sensitive eggs of some sturgeon species, for example *Huso huso, Acipenser transmontanus* or *Acipenser ruthenus* are used, an additional calcium exposure step can also be applied (or put in front):

Additional performing of the calcium exposure step:
Preparing another 0.5 to 2 millimolar calcium cations solution of calcium chloride (e.g., 1.6 mmol/l $Ca^+$, see FIG. 3) in deionized water having a conductivity of 10 μS/cm (at 25° C.) and a temperature in the polar temperature range of 10° C.,
Introducing the live, mature eggs into the other solution for a calcium exposure time of 12 min, and
Removing the treated eggs from the second solution, and
Brief dipping of the treated eggs into a 0.9 percent physiological saline solution.

In addition to the elastic stabilization layer from the potassium exposure step, the second step forms a structural protein cross-linking of the egg envelope in addition which is located in fish and crustaceans in the already present zones *radiata interna* and *radiata externa* of the egg envelope. This additional structural protein cross-linking of the egg envelope by tyrosine residues gives in particular large and soft or sensitive eggs plastic firmness—in addition to the elasticity from the potassium exposure step. Optional dipping is also used here for additional controllability. The resulting product is (genuine) caviar from live, mature eggs of sturgeon, which can then be further processed as follows:

Mixing the caviar with dry ($K^+$- and $Ca^{++}$-free of anti-caking agents) sodium chloride NaCl (3.5 g/100 g caviar, 3.5%), which corresponds to a malossol salting for preservation,
Filling the lightly salted caviar in glass containers, preferably 500 g maturing glasses, and air-tight vacuum-sealing the containers with screw caps and labeling,
Storing of the glass containers at −2° C. for 2 to 4 months for further maturing of the caviar and optionally
Freezing of fresh caviar or caviar matured according to customer requirements in glass containers at −18° C.

The live, mature eggs treated in the potassium exposure step form a completely new zone due to the treatment: the stabilization layer, which is elastic and hyaline (gel-like).

The stabilization layer can be easily colored for detection. It is located between the alveolar layer AL and the *zona radiata externa* ZRE and has so far not been described in the literature. Refer to descriptive Introduction with the corresponding Siddique glossary for the structural organization of the egg envelope of fish and crustaceans.

The table in FIG. 2 is based on measurements of the diameter (thickness in µm) of the extracellular egg envelope on mature eggs of the Siberian sturgeon on the basis of cryosections of constant layer thickness (10 µm) using computer-controlled image analysis (Zeiss) under the influence of different treatments to stabilize the egg envelope. The table shows the formation of a new stabilization layer SS and the diameter of existing layers (ZRI, ZRE, AL) of the egg envelope under treatment with different concentration additions in mmol/l of potassium cations $K^+$ alone (from potassium citrate) and in combination with calcium cations $Ca^{++}$ (from calcium chloride) during the various exposure steps according to the invention. Live, mature eggs from the Siberian sturgeon *Acipenser baerii* were treated. In addition to the acronyms already explained in the foregoing and in the case of Siddique, Mv means mean value, and Std means standard deviation. The values given are those for the new elastic stabilization layer SS. Furthermore, reference is made to the state of the art in accordance with the above-mentioned WO 2007/045233 A1.

The quality controls after the treatments showed that only at concentrations of 1 mmol/l and 1.5 mmol/l potassium cations a thickness of the egg envelope of at least 12 µm is achieved and an intermediate product is formed which has lost its stickiness and is stable enough for the further processing of caviar. Furthermore, it was shown that a treatment duration of preferably 10 minutes is reasonable so that all live eggs in the solution react metabolically. A treatment amount of 2.5 kg of caviar (in approx. 25 l solution) in a treatment unit could be achieved. The sensory examination of the caviar after the treatment with potassium cations according to the invention showed that the elastic texture of the caviar of the Siberian sturgeon did not show any differences in concentration variations between 1 mmol/l and 1.5 mmol/l. On the other hand, the eggs treated in the one solution with lower potassium cations concentrations are different in texture and only a few eggs are stable, while the untreated eggs are very soft and burst. In accordance with the sensory tests carried out, treatment with two exposure steps (potassium and calcium cations) leads to a solid, pearly product, also referred to as "super plop" in the case of eggs of the Siberian sturgeon.

The table in FIG. 3 shows the presence and diameters (thickness in µm) of layers of extracellular egg envelope with different treatments in accordance with the invention of live large eggs from the Beluga sturgeon *Huso huso*. During the treatment of this caviar with potassium cations (from potassium citrate), the formation of the new eosinophilic stabilization layer SS in the extracellular egg envelope was also observed, which is also located between the ZRE and the AL. The sensory tests carried out on the large eggs of the beluga sturgeon showed that double treatment with potassium and calcium cations leads to optimal results with regard to the texture of the fragile live, mature eggs.

FIGS. 4A, B, C, D show SEM images of the change in the structure of the extracellular egg envelope of live, mature eggs, by way of example of the Siberian sturgeon under various treatments. Two magnifications are shown: left 6000× and right (cutouts) 12000×. The treatments were always carried out on the live egg, which was shock frozen in hexane at −80° C. in order to produce cryopreparations to maintain its native state.

FIG. 4A In untreated mature eggs, the zones of the egg envelope show no clear separation from one another (prior art).

FIG. 4B Under the influence of 0.5 mmol/l potassium, the new stabilization layer SS is already formed between the *zona radiata externa* ZRE and the alveolar layer AL, while the *zona radiata interna* ZRI and *zona radiata externa* ZRE show an unchanged loose protein structure as in untreated eggs.

FIG. 4C The successive double treatment of the eggs with potassium and calcium cations shows both characteristic morphological features in the SEM, namely the stabilization layer SS by the potassium treatment AND the twisting and cross-linking of the protein strands in the *zona radiata interna* ZRI and the *zona radiata externa* ZRE, which is characteristic for a calcium treatment, compare FIG. 4D.

FIG. 4D Calcium treatment alone leads to strong twisting and cross-linking of the loose protein strands in the *zona radiata interna* ZRI and the *zona radiata externa* ZRE (prior art), compare FIG. 4A and FIG. 4B without calcium treatment.

Figures 5A, 5B:
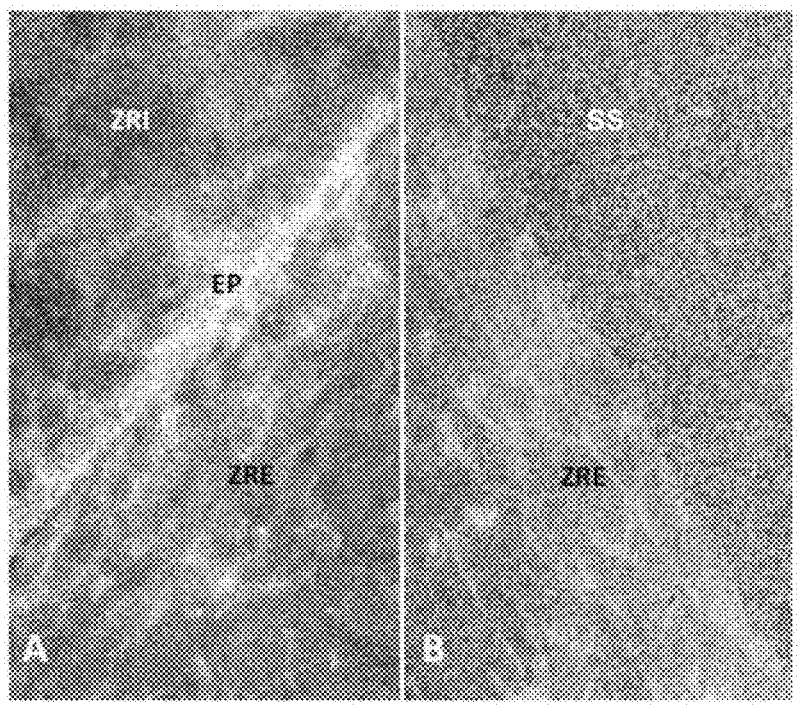
Figures 5C, 5D:
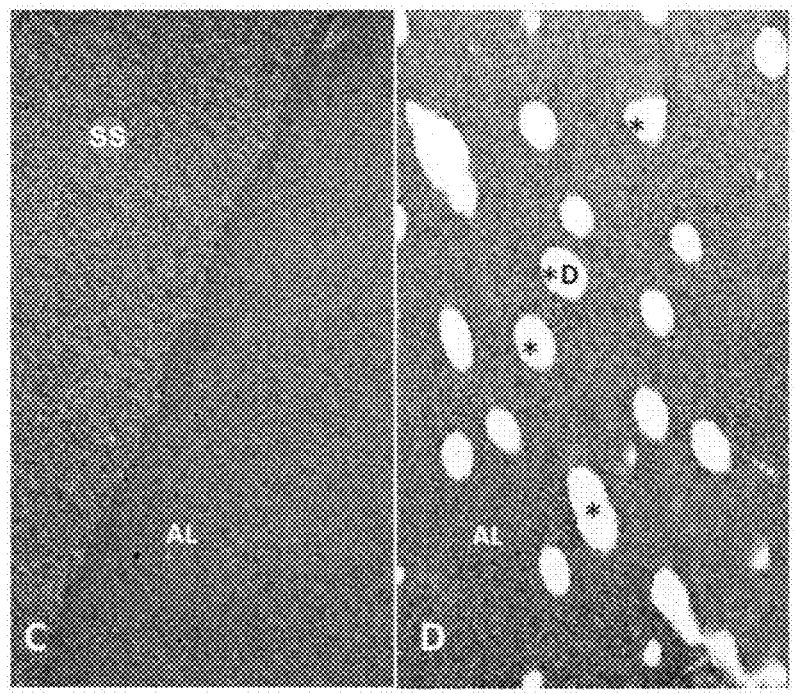

FIGS. 5A, B, C, D show transmission electron microscope images (TEM, 3000-fold magnification) of the multi-layered structure of the egg envelope of mature sturgeon eggs during treatment with 1.0 mmol/l potassium cations. FIG. 5A shows the *zona radiata interna* ZRI with loose, cloudy fibrils separated from the *zona radiata externa* ZRE by the epilayer EP (phenomenon can only be identified ultra-structurally). The *zona radiata externa* ZRE is characterized by a filamentous network of elongated fibrils. FIG. 5B shows the ultra-structural formation of the new stabilization layer SS with a fine-granular structure directly between the *zona radiata externa* ZRE and—in accordance with FIG. 5C—the alveolar layer AL, which is permeated to the periphery of the egg envelope—in accordance with FIG. 5D—by small ductuli (small ducts, channels). The ultra-structural analyzes confirm that treatment with potassium cations (1.0 mmol/l) in accordance with certain embodiments of the invention leads to the formation of a previously unknown new stabilization layer SS with amorphous structure and positioning in fish and crustaceans between the *zona radiata externa* ZRE and the alveolar layer AL.

FIGS. 6A, B, C, D show TEM images (3000-fold magnification) of the cortical granules CG in the peripheral egg plasma within the plasma membrane of the mature eggs, wherein FIG. 6A shows an untreated egg (prior art), FIG. 6B shows an egg treated with potassium cations, FIG. 6C shows an egg treated with potassium and calcium cations and FIG. 6D shows an egg treated only with calcium cations (prior art).

Cortical granules are secretory organelles (structurally delimitable regions) found in eggs and closely associated with the fertilization event. Cortical granules contain enzymes such as peroxidase and structural elements for tyrosine cross-linking of the *zona radiata interna* ZRI and the *zona radiata externa* ZRE. As analyzed by TEM under the influence of the various treatments, the cortical response and the discharge of its contents are triggered by treatment with calcium cations. An identical process also occurs in natural fertilization by the sperm-induced calcium wave in the egg plasma membrane. In the untreated egg (FIG. 6A), the cortical granules CG with their enzyme endowment are clearly recognizable as large, round vesicles (bubbles) in the peripheral egg plasma, which also contain structural elements. Likewise, the cortical granules CG are still present unchanged during potassium treatment alone in accordance with the invention (FIG. 6B). However, strong vesicular transport can be observed at the plasma membrane from the egg plasma into the acellular egg envelope. In FIG. 6A and FIG. 6B the yolk is marked with D. In a double treatment with potassium and calcium cations (FIG. 6C), both the discharge (arrows) of the contents of the cortical granules CG and the formation of the new stabilization layer SS occur. Treatment with calcium cations alone (FIG. 6D) only leads to a cortical response, wherein the contents are discharged into the acellular egg envelope and the enzymatic cross-linking of the *zona radiata interna* ZRI and *zona radiata externa* ZRE is initiated by tyrosine residues. Empty vacuoles V remain in the egg plasma.

For the diagnostic screening of cryosections for potassium effect in the invention, in FIG. 7A and FIG. 7B, light microscopical images (400-fold magnification) of untreated live eggs of the Siberian sturgeon *Acipenser baerii* from the prior art are shown. The left photograph in accordance with FIG. 7A shows HE staining (hematoxylineosin staining), the right photo in accordance with FIG. 7B shows alcian blue staining. This test stains glucosaminoglycans GAG, hyaluron and fibrin. It can be seen that the alcian blue is missing in the various layers of the egg envelope but is distinctly present in the ooplasm OP. The individual layers are characterized according to the above embodiments and are marked in their thicknesses by double arrows.

Figure 7C:
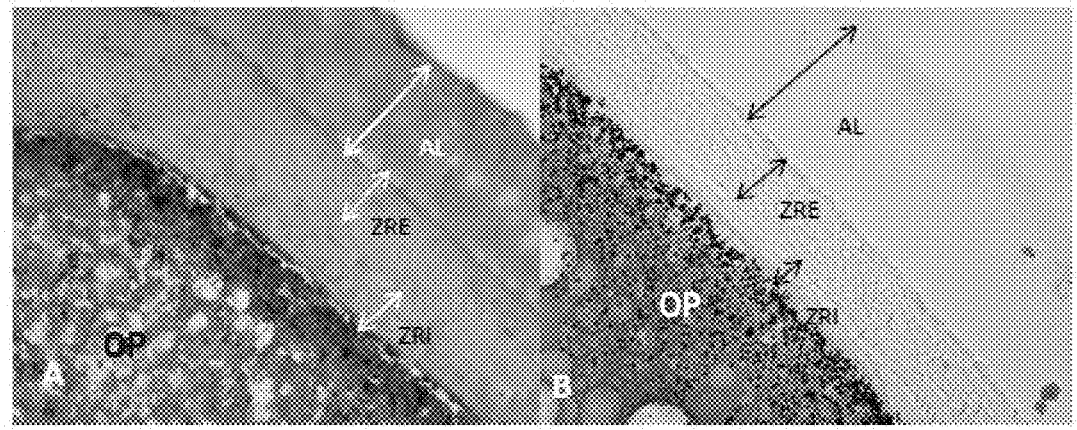
Figure 7D:
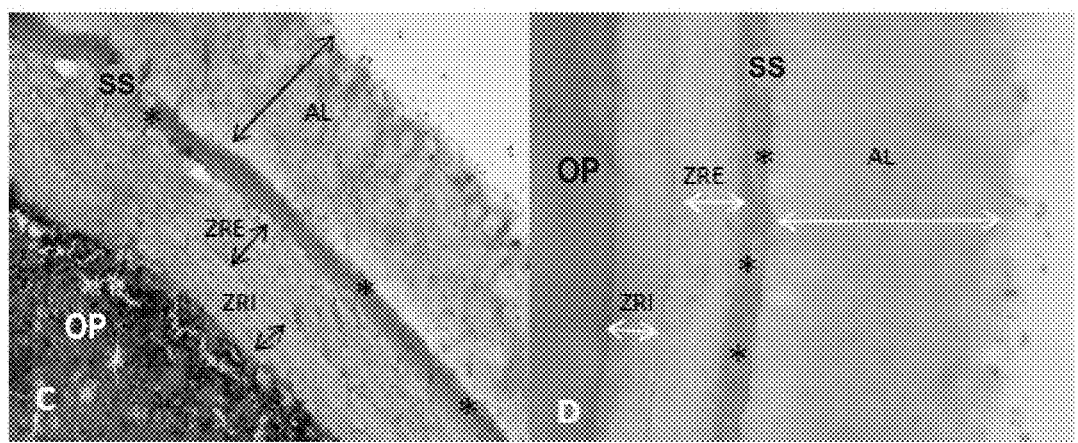

FIG. 7C and FIG. 7D, on the other hand, show photographs of cryosections of live, mature eggs in the ovulated state of the Siberian sturgeon *Acipenser baerii* treated with the potassium exposure step method claimed by the invention. The eggs were treated with a concentration of 1.5 mmol/l potassium cations (from potassium citrate). The occurrence of the new stabilization layer SS between the *zona radiata externa* ZRE and the alveolar layer AL in the extracellular egg envelope is noticeable. The left photo in accordance with FIG. 7C shows that this new stabilizing layer SS is particularly eosinophilic after staining with eosin. The right photo in accordance with FIG. 7D shows that this new stabilization layer SS is particularly rich in GAG after staining with alcian blue. The particularly advantageous elasticity of the new stabilization layer SS can be derived therefrom.

Figure 8A:
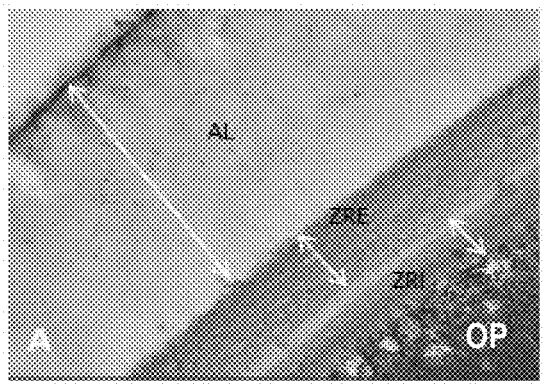

For diagnostic screening of cryosections for calcium effect alone and double treatment effect by potassium and calcium cations, FIG. 8A and FIG. 8B show photos from the prior art of cryosections of mature eggs of the Siberian sturgeon *Acipenser baerii* treated with the method in accordance with WO 2007/045233 A1, magnified 400-fold. The left photograph in accordance with FIG. 8A shows HE staining (hematoxylineosin staining), the right photo in accordance with FIG. 8B shows alcian blue staining. The ovulated eggs of the Siberian sturgeon were treated. The left photo in accordance with FIG. 8A with the HE staining reveals the protein strands cross-linked by tyrosine molecules in the *zona radiata interna* ZRI and *zona radiata externa* ZRE. A distinct separation between the two zones can be seen. The cross-linking results in structural stabilization of the egg envelope. In the right photo in accordance with FIG. 8B with the alcian blue staining, it can be seen that the *zona radiata interna* ZRI and the *zona radiata externa* ZRE are stained only very weakly, which has resulted in little GAG and a lower elasticity, whereas in the ooplasm OP a strong staining indicates very much GAG.

Figure 8C:
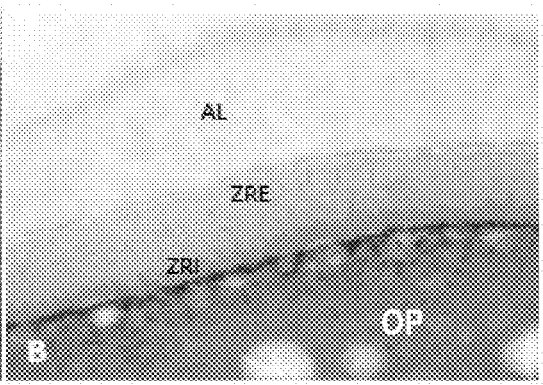
Figure 8C:
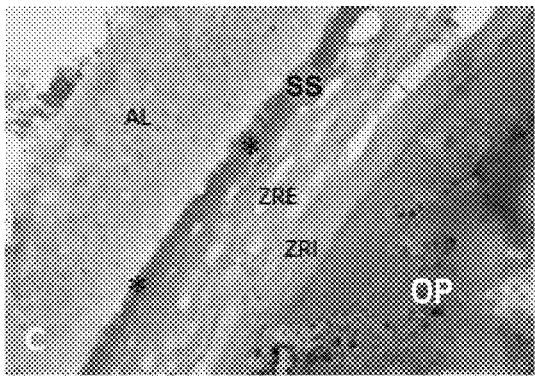
Figure 8D:
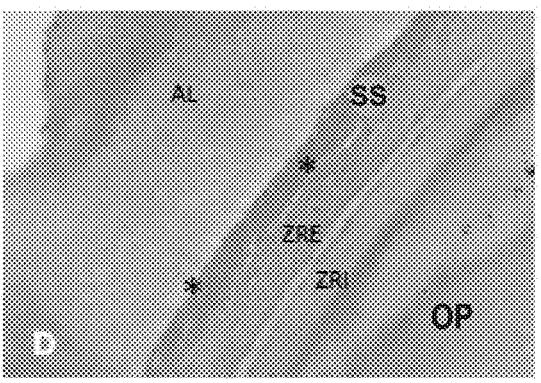

In FIG. 8C and FIG. 8D, photos of cryosections of live ovulated eggs processed with the claimed method are shown, which have been treated in the additional calcium exposure step with the method in accordance with WO 2007/045233 A1. The mature ovulated eggs of the Siberian sturgeon *Acipenser baerii* were treated with 1.5 mmol/l potassium cations (from potassium citrate) in the potassium exposure step and with 1.6 mmol/l calcium cations (from calcium chloride) in the calcium exposure step. In addition to solidifying cross-linking of the egg envelope shown in the photos in accordance with FIG. 8A and FIG. 8B, the new hyaline stabilization layer SS with its stabilization function of the egg envelope can also now be seen in the photos in accordance with FIG. 8C and FIG. 8D. The treated live, mature eggs of the Siberian sturgeon are thus stabilized both elastically (by GAGs) and structurally (by protein cross-linking) and form a perfect caviar.

Figure 9A:
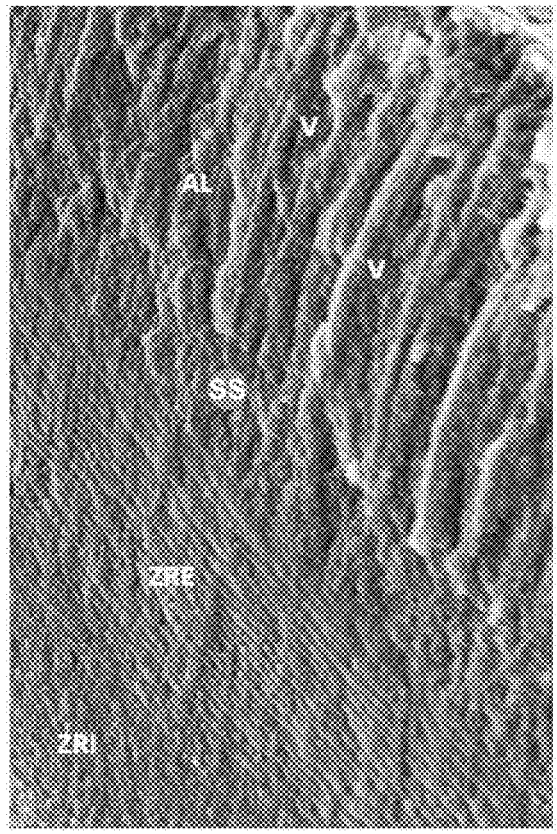
Figure 9B:
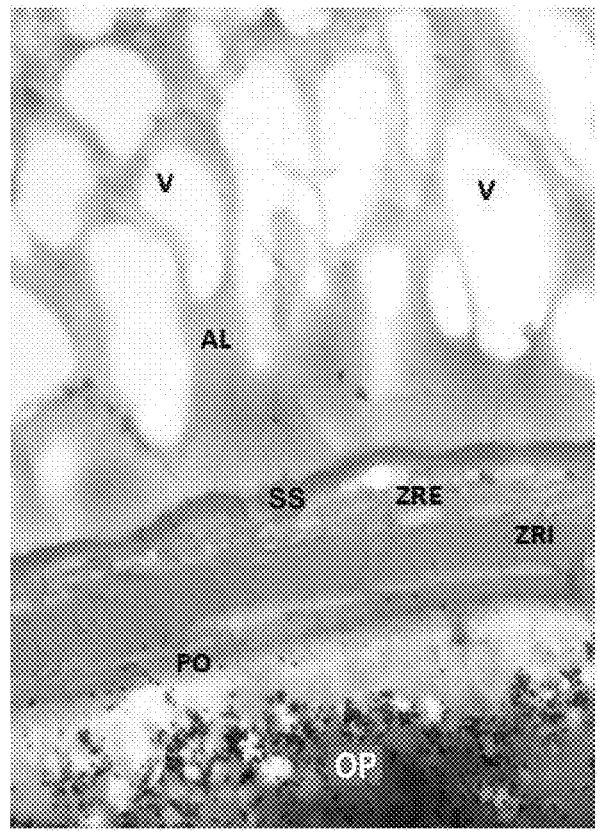

FIG. 9A shows a characteristic SEM image (magnification 12000-fold) of the egg envelope of live, mature ovulated eggs from the Beluga sturgeon *Huso huso* after double treatment according to the invention. FIG. 9B shows a light microscope image (400-fold magnification) of the egg envelope of live, mature, ovulated eggs from the Beluga sturgeon *Huso huso* after double treatment according to the invention. Both images show the new stabilization layer SS and the cross-linking of the *zona radiata interna* ZRI and *zona radiata externa* ZRE. Furthermore, it is noticeable that the eggs of the *Huso huso* have an extremely distinctive alveolar layer AL with large vacuoles V. The screening of the cryosections with H&E staining confirms the formation of the new elastic stabilization layer SS with one potassium cation exposure step and the additional protein cross-linking in the egg envelope with two exposure steps with potassium and calcium cations.

LIST OF REFERENCE SIGNS

AL Alveolar layer
$Ca^{++}$ Calcium cations
CG Cortical granules
D Yolk
EP Epilayer
$K^+$ Potassium cations
Mv Mean value
OP Oocyte plasma (egg plasma)
PO Plasma membrane of oocyte (inner egg cell)
SS Stabilization layer
Std Standard deviation
V Vacuole
ZRI *Zona radiata interna*
ZRE *Zona radiata externa*

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing caviar or a caviar substitute product from live, mature, ovulated eggs of bony fish or crustaceans, wherein the live, mature, ovulated eggs comprise an egg envelope having three or more layers, are in a fertile but unfertilized state, comprise egg plasma, and have a natural potassium content in the egg plasma, the method comprising: treating the live, mature, ovulated eggs in a saline solution which does not damage the live, mature, and ovulated eggs and subsequently treating the live, mature, and ovulated eggs in a solution of water and potassium in a concentration which does not damage the live, mature, and ovulated eggs and does not change the eggs' natural potassium content,
  wherein an elastic stabilizing layer is formed in the egg envelope between a *zona radiata interna* layer and an alveolar layer after treatment in the solution of water and potassium,
  wherein the water is deionized prior to addition of a potassium donor for forming a cationic component in the solution of water and potassium, wherein the solution of water and potassium has a temperature that does not damage the live, mature, and ovulated eggs, wherein the concentration of potassium cations in the cationic component of the solution of water and potassium is between 0.1 mmol/l and 3.0 mmol/l,
  wherein the live, mature, and ovulated eggs are treated in the solution of water and potassium for a duration of a potassium exposure time until an egg envelope of the live, mature, and ovulated eggs obtains a desired elastic stabilization.

2. The method according to claim 1, wherein the potassium donor is at least one potassium salt.

3. The method according to claim 1, wherein the potassium exposure time in the treating of the live, mature, and ovulated eggs in the solution of water and potassium is between 5 min and 30 min.

4. The method according to claim 1, further comprising treating the live, mature, and ovulated eggs in a solution of water and calcium after or prior to treating the live, mature, and ovulated eggs in the solution of water and potassium, wherein the calcium is dissolved in the solution of water and calcium in a concentration which does not damage the live, mature, and ovulated eggs, wherein the water is deionized prior to the addition of a calcium donor for the formation of a cationic component in the solution of water and calcium, wherein the solution of water and calcium has a temperature which does not damage the live, mature, and ovulated eggs, and wherein the live, mature, and ovulated eggs are treated in the solution of water and calcium for a calcium exposure time until the egg envelope of the live, mature, and ovulated eggs obtains a desired structural stabilization.

5. The method according to claim 4, wherein the calcium donor is at least one calcium salt.

6. The method according to claim 4, wherein the concentration of calcium cations in the cationic component of the solution of water and calcium is between 0.1 mmol/l and 3.0 mmol/l.

7. The method according to claim 5, wherein the live, mature, and ovulated eggs have a grain size equal to or greater than 3.2 mm in diameter or have a texture in a hardness test below 0.3 Newton.

8. The method according to claim 4, wherein the calcium exposure time is between 9 min and 30 min.

9. The method according to claim 4, wherein the temperature of the solution of water and potassium and/or the solution of water and calcium is selected from the group consisting of a polar temperature range between 1° C. and 15° C., a moderate temperature range between 10° C. and 20° C., and a tropical temperature range between 20° C. and 29° C.

10. The method according to claim 1, wherein the deionized water has an electrical conductivity at 25° C. of between 1 µS/cm and 15 µS/cm.

11. The method according to claim 1, wherein the solution of water and potassium has a pH between 6.8 and 8.0.

12. The method according to claim 1, further comprising salting the live, mature, ovulated eggs with 2.0% to 3.8% sodium chloride after treating the live, mature, and ovulated eggs in the solution of water and potassium, wherein the sodium chloride is free of potassium and calcium donors.

13. The method according to claim 12, wherein the caviar or caviar substitute product is subsequently stored in hermetically sealed glass containers for one to three months at a temperature between −2° C. and −4° C.

14. The method according to claim 12, characterized in that wherein the caviar or caviar substitute product is frozen in a temperature range between −20° C. and −15° C. after salting.

15. The method according to claim 1, wherein after the desired elastic stabilization is achieved, the live, mature, and ovulated eggs are dipped in a second saline solution which does not damage the live, mature, and ovulated eggs.

16. The method according to claim 1, wherein the live, mature, ovulated eggs of fish or crustaceans have a polarization index "PI" of 0.05≤PI≤0.15.

17. The method according to claim 1, wherein the live, mature, and ovulated eggs of fish or crustaceans were harvested in an ovulated state by spawning or stripping.

18. The method according to claim 1, wherein the saline solution is a physiological saline solution.

19. The method according to claim 1, wherein the saline solution is a 0.6 percent to 1.0 percent saline solution.

20. The method according to claim 1, wherein the elastic stabilizing layer is formed in the egg envelope between a *zona radiata externa* layer and the alveolar layer after treatment in the solution of water and potassium.

* * * * *